United States Patent
Sawada et al.

(10) Patent No.: US 8,244,188 B2
(45) Date of Patent: Aug. 14, 2012

(54) TRANSMITTING AND RECEIVING CIRCUIT

(75) Inventors: Masaru Sawada, Yokohama (JP);
Hideaki Kondo, Yokohama (JP); Norio Murakami, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 12/692,325

(22) Filed: Jan. 22, 2010

(65) Prior Publication Data

US 2010/0120375 A1    May 13, 2010

Related U.S. Application Data (63) Continuation of application No. PCT/JP2007/064522, filed on Jul. 24, 2007.

(51) Int. Cl.
*H04B 1/40* (2006.01)

(52) U.S. Cl. ......... 455/73; 455/127.1; 455/522; 455/78; 455/77; 455/575.1; 327/558; 327/553; 327/551; 327/559

(58) Field of Classification Search .................. None
See application file for complete search history.

(56) References Cited

U.S. PATENT DOCUMENTS

| | | | |
|---|---|---|---|
| 5,787,339 A | 7/1998 | Asazawa | |
| 7,292,827 B2 * | 11/2007 | McCorkle | 455/78 |
| 7,676,199 B2 * | 3/2010 | Warner et al. | 455/78 |
| 7,844,230 B2 * | 11/2010 | Darabi et al. | 455/73 |
| 8,126,036 B2 * | 2/2012 | Koren et al. | 375/219 |
| 2001/0029168 A1 * | 10/2001 | Yamaguchi | 455/73 |
| 2002/0077066 A1 * | 6/2002 | Pehlke et al. | 455/73 |
| 2002/0150151 A1 * | 10/2002 | Krone et al. | 375/219 |
| 2002/0160722 A1 * | 10/2002 | Terranova et al. | 455/73 |
| 2004/0130388 A1 * | 7/2004 | Block et al. | 327/558 |
| 2005/0026571 A1 * | 2/2005 | Yang et al. | 455/78 |

FOREIGN PATENT DOCUMENTS

| | | |
|---|---|---|
| EP | 0 714 177 A2 | 5/1996 |
| JP | 8-149038 A | 6/1996 |
| JP | 10-93470 A | 4/1998 |
| JP | 2002-94343 A | 10/2003 |

OTHER PUBLICATIONS

H. Ishida et al., "A High-Power RF Switch IC Using AlGaN/GaN NFETs with Single-Stage Configuration", IEEE Trans. on Electron Devices, vol. 52, No. 8 pp. 1893-1899, Aug. 2005.

(Continued)

*Primary Examiner* — Matthew Anderson
*Assistant Examiner* — Ganiyu A Hanidu
(74) *Attorney, Agent, or Firm* — Arent Fox LLP (57) ABSTRACT

A transmitting and receiving circuit includes a transmitting side amplifier circuit amplifying a transmission signal transmitted from an antenna, a receiving side amplifier circuit amplifying a reception signal received by the antenna and being electrically connected to the a transmitting side amplifier circuit, a first matching circuit matching the antenna and the transmitting side amplifier circuit, a second matching circuit matching the antenna and the receiving side amplifier circuit, a first current source circuit capable of controlling an operating state and setting a first connection point between the first matching circuit and an output terminal of the transmitting side amplifier circuit to a given voltage, and a second current source circuit capable of controlling an operating state and setting a second connection point between the second matching circuit and an input terminal of the receiving side amplifier circuit to a given voltage.

10 Claims, 5 Drawing Sheets

OTHER PUBLICATIONS

D. Kelly et al., "The State-of-the-Art of Silicon-on-Sapphire CMOS RF Switches", CSIC 2005 Digest, pp. 200-203, 2005 IEEE.

R. Point et al., "An RF CMOS Transmitter Integrating a Power Amplifier and a Transmit/Receive Switch for 802.11b Wireless Local Area Network Applications", 2003 IEEE Radio Frequency Integrated Circuits Symposium.

C. K. Lee, et al, "An ISM-915 MHz RF Transceiver IC", in 1999 Int. Symp. VLSI Technology, Systems, and Applications, June, pp. 163-166.

* cited by examiner

TRANSMITTING AND RECEIVING CIRCUIT

CROSS-REFERENCE TO RELATED APPLICATION

This application is a Continuation of International Application No. PCT/JP2007/064522, with an international filing date of Jul. 24, 2007, which designating the United States of America, the entire contents of which are incorporated herein by reference.

FIELD

The present embodiment relates to a transmitting and receiving circuit.

BACKGROUND

In a conventional half-duplex radio communication system, there is provided an antenna switching switch for performing a connection switching, and an antenna is used in common for transmission and reception (refer to, for instance, Non-Patent Documents 1 to 4).

Figure 8:
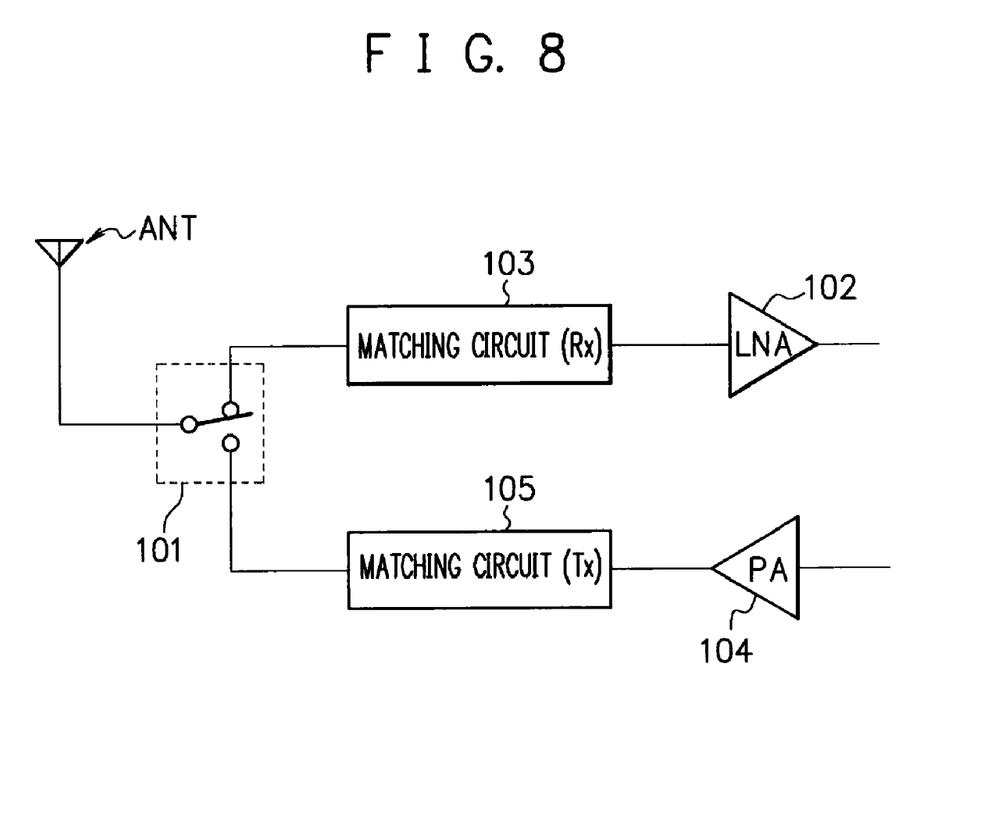
FIG. 8 is a view illustrating a configuration of a conventional transmitting and receiving circuit having an antenna switching switch.

FIG. 8 illustrates a transmitting and receiving circuit in the conventional half-duplex radio communication system. As illustrated in FIG. 8, the conventional radio communication system conducts the communication by selectively connecting a transmitting circuit or a receiving circuit to an antenna ANT using an antenna switching switch 101.

At a time of reception, the antenna switching switch 101 is controlled and a signal received by the antenna ANT is input to a receiving circuit (a low noise amplifier (LNA) being a receiving side amplifier) 102 via a matching circuit (Rx) 103, as illustrated in FIG. 8. Further, at a time of transmission, the antenna switching switch 101 is switched to connect the antenna ANT and a transmitting circuit, and a signal output from a transmitting circuit (a power amplifier PA being a transmitting side amplifier) 104 is transmitted from the antenna ANT via a matching circuit (Tx) 105.

In the conventional radio communication system having the antenna switching switch 101, the receiving side circuit and the transmitting side circuit are not electrically connected. For this reason, each of the matching circuit (Tx) 105 between the transmitting circuit (PA) 104 and the antenna ANT and the matching circuit (Rx) 103 between the antenna ANT and the receiving circuit (LNA) 102 is individually designed.

In a weak radio communication for a communication distance of about several meters (radio communication conducted by a radio station requiring no license), a transmission power is small (for instance, the power is less than −41.3 dBm (300 MHz) in a Japanese domestic standard) and an influence of signal leakage between the transmitting circuit and the receiving circuit is small, so that the communication is applied to a radio communication system of low power consumption and small size to be incorporated in a portable device. Therefore, a reduction of a mounting area is required.

Here, since the transmission power is small in the weak radio communication, an antenna may be used in common without using an antenna switching switch (with no antenna switching switch), which enables to reduce the number of parts (mounting area). However, a transmitting side circuit and a receiving side circuit are electrically connected all the time, so that an optimum design may not be conducted with respect to matching circuits that simultaneously match between an antenna and a transmitting circuit (PA) and between the antenna and a receiving circuit (LNA), and thus it is difficult to optimize the matching circuits on a transmitting side (Tx) and on a receiving side (Rx).

Non-Patent Document 1: H. Ishida, et al. "A High-Power RF Switch IC Using AlGaN/GaN HFETs with Single-Stage Configuration", IEEE Trans. On Electron Devices, vol. 52, no. 8, pp. 1893-1899, August 2005

Non-Patent Document 2: D. Kelly, et al. "The state-of-the-Art of Silicon-on-sapphire CMOS RF Switches", CSIC 2005 Digest, pp. 200-203, 2005 IEEE Non-Patent Document 3: R. Point et al, "An RF CMOS Transmitter Integrating a Power Amplifier and a Transmit/Received Switch for 802.11b Wireless Local Area Network Applications", 2003 IEEE Radio Frequency Integrated Circuits Symposium Non-Patent Document 4: C. K. Lee, et al, "An ISM-915 MHz RF Transceiver IC", in 1999 Int. Symp. VLSI Technology, Systems, and Applications, June, pp. 163-166

SUMMARY

According to an aspect of the embodiments, a transmitting and receiving circuit includes a transmitting side amplifier circuit amplifying a transmission signal transmitted from an antenna, a receiving side amplifier circuit amplifying a reception signal received by the antenna and being electrically connected to the a transmitting side amplifier circuit, a first matching circuit matching the antenna and the transmitting side amplifier circuit, a second matching circuit matching the antenna and the receiving side amplifier circuit, a first current source circuit capable of controlling an operating state and setting a first connection point between the first matching circuit and an output terminal of the transmitting side amplifier circuit to a given voltage, and a second current source circuit capable of controlling an operating state and setting a second connection point between the second matching circuit and an input terminal of the receiving side amplifier circuit to a given voltage.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an embodiment will be described based on the drawings.

Figure 1:
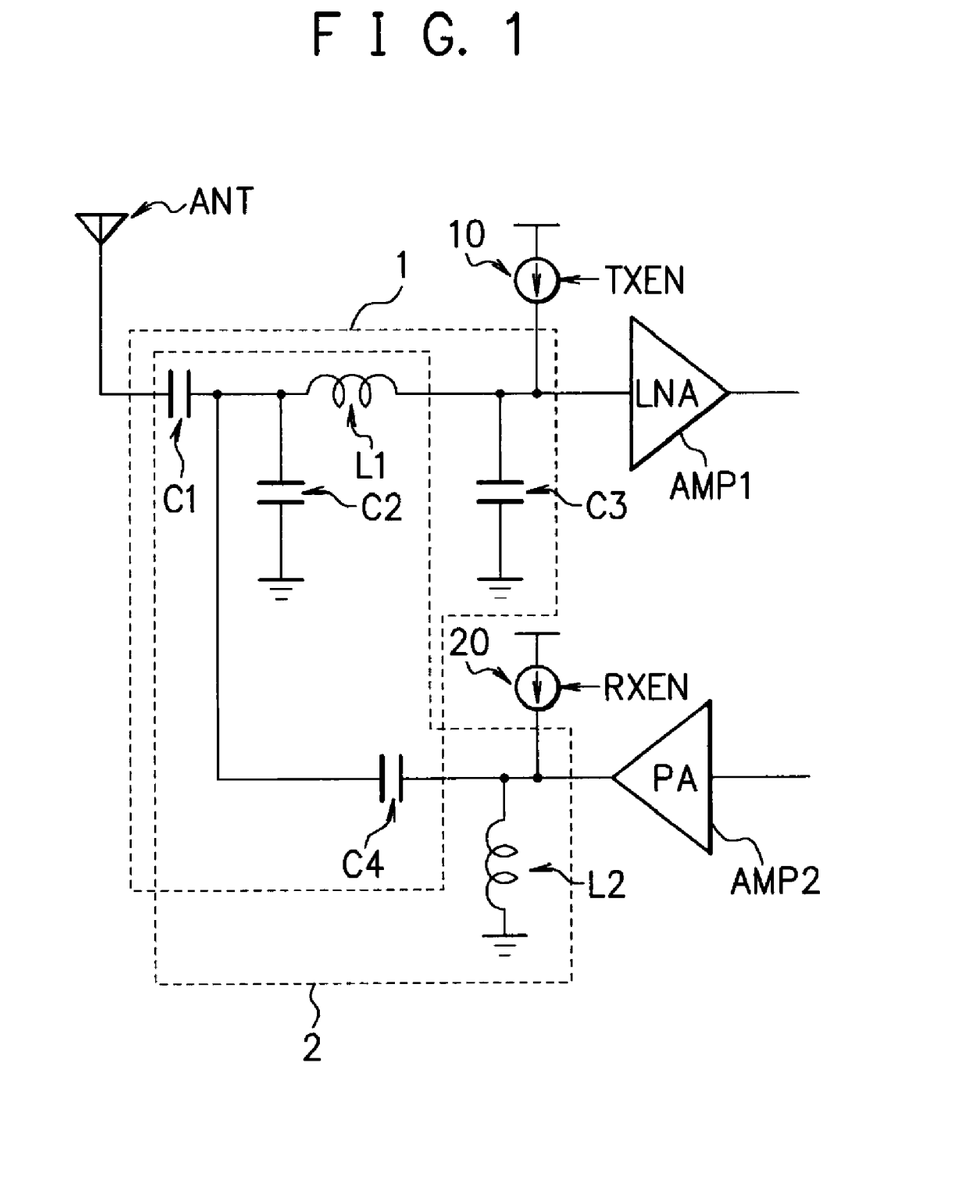
FIG. 1 is a view illustrating a configuration example of a transmitting and receiving circuit with no antenna switching switch according to an embodiment.

FIG. 1 is a view illustrating a configuration example of a transmitting and receiving circuit with no antenna switching switch according to an embodiment. In the transmitting and receiving circuit illustrated in FIG. 1, an antenna ANT is used in common by a transmission circuit and a reception circuit without using a switch, and a receiving side amplifier (LNA: receiving side amplifier circuit) AMP1 and a transmitting side amplifier (PA: transmitting side amplifier circuit) AMP2 are electrically connected all the time.

The transmitting and receiving circuit in the present embodiment is applied to, for instance, a weak radio communication. Further, as will be described later, in the transmitting and receiving circuit in the present embodiment, a matching circuit 1 on a receiving side and a matching circuit 2 on a transmitting side are formed by mutually sharing circuit elements. The circuits illustrated in FIG. 1 except the antenna ANT are formed of, for instance, CMOS circuits, and may be realized by one chip of CMOS-LSI.

In FIG. 1, a capacitance C1 has a first electrode connected to the antenna ANT and a second electrode connected to one end of an inductor L1. The other end of the inductor L1 is connected to an input terminal of the receiving side amplifier (LNA) AMP1.

A capacitance C2 has a first electrode connected to an interconnection point between the second electrode of the capacitance C1 and the one end of the inductor L1 and a second electrode that is grounded (connected to a reference potential). A capacitance C3 has a first electrode connected to an interconnection point between the other end of the inductor L1 and the input terminal of the receiving side amplifier (LNA) AMP1 and a second electrode that is grounded.

A capacitance C4 has a first electrode connected to an interconnection point between the second electrode of the capacitance C1 and the one end of the inductor L1 and a second electrode connected to an output terminal of the transmitting side amplifier (PA) AMP2. One end of an inductor L2 is connected to an interconnection point between the second electrode of the capacitance C4 and the output terminal of the transmitting side amplifier (PA) AMP2 and the other end thereof is grounded.

The receiving side amplifier (LNA) AMP1 is an amplifier circuit that amplifies a reception signal received by the antenna ANT. The receiving side amplifier (LNA) AMP1 is formed of, for instance, a low noise amplifier. The transmitting side amplifier (PA) AMP2 is an amplifier circuit that amplifies a transmission signal transmitted from the antenna ANT. The transmitting side amplifier (PA) AMP2 is formed of, for instance, a power amplifier.

A current source circuit 10 is connected to the input terminal of the receiving side amplifier (LNA) AMP1, and is on/off-controlled by a control signal TXEN. The current source circuit 10 becomes an on state when a transmitting operation is conducted in the transmitting and receiving circuit (when the control signal TXEN is activated), and fixes the input terminal of the receiving side amplifier (LNA) AMP1 (a connection point between the matching circuit 1 on the receiving side and the input terminal of the receiving side amplifier (LNA) AMP1) to a constant voltage.

A current source circuit 20 is connected to the output terminal of the transmitting side amplifier (PA) AMP2, and is on/off-controlled by a control signal RXEN. The current source circuit 20 becomes an on state when a receiving operation is conducted in the transmitting and receiving circuit (when the control signal RXEN is activated), and fixes the output terminal of the transmitting side amplifier (PA) AMP2 (a connection point between the matching circuit 2 on the transmitting side and the output terminal of the transmitting side amplifier (PA) AMP2) to a constant voltage.

Note that the current source circuit 10 becomes an off state when the receiving operation is conducted in the transmitting and receiving circuit, and the current source circuit 20 becomes an off state when the transmitting operation is conducted in the transmitting and receiving circuit. Further, the control signals TXEN, RXEN are exclusively activated and are not activated at the similar time.

Figure 2:
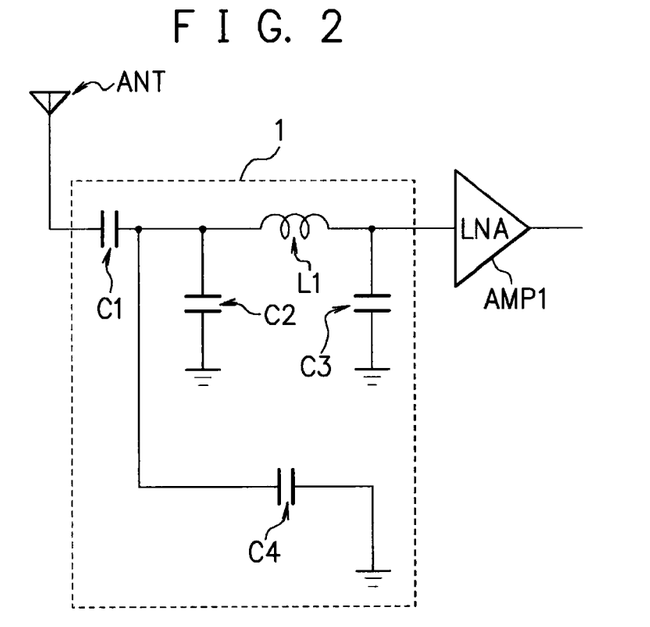
FIG. 2 is a view illustrating an equivalent circuit of the transmitting and receiving circuit (at a time of receiving operation) illustrated in FIG. 1.

FIG. 2 illustrates an equivalent circuit at the time of receiving operation in the transmitting and receiving circuit illustrated in FIG. 1. As described above, at the time of receiving operation, the current source circuit 20 becomes an on state and fixes the output terminal of the transmitting side amplifier (PA) AMP2 to a constant voltage, which creates a state corresponding to a state in which an output of the transmitting side amplifier (PA) AMP2 is grounded in terms of an AC signal.

Accordingly, a part formed of the capacitance C4 and the inductor L2 connected to the output of the transmitting side amplifier (PA) AMP2 is approximated to the grounded capacitance C4 as illustrated in FIG. 2. Therefore, the matching circuit 1 on the receiving side is approximated to the equivalent circuit formed of the capacitances C1, C2, C3, C4 and the inductor L1 as illustrated in FIG. 2.

Figure 3:
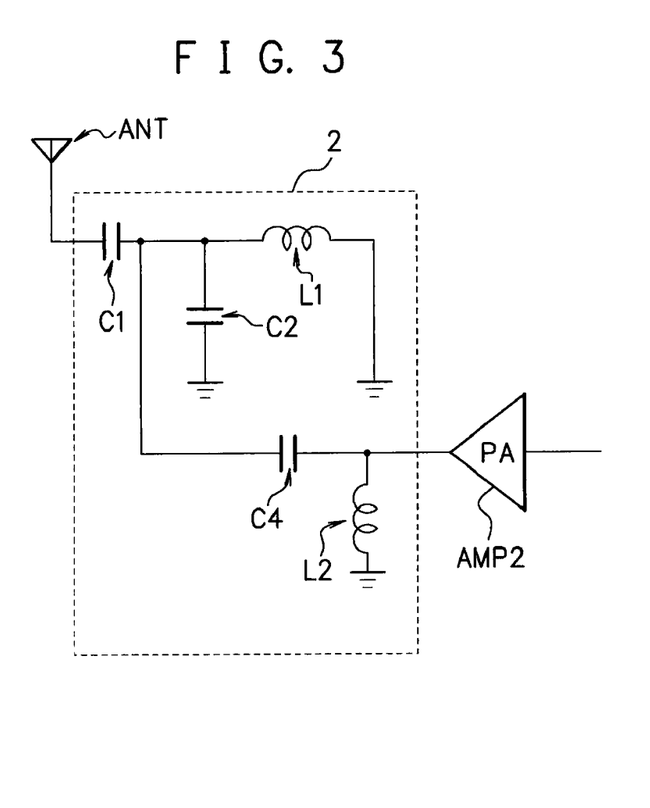
FIG. 3 is a view illustrating an equivalent circuit of the transmitting and receiving circuit (at a time of transmitting operation) illustrated in FIG. 1.

FIG. 3 illustrates an equivalent circuit at the time of transmitting operation in the transmitting and receiving circuit illustrated in FIG. 1. As described above, at the time of transmitting operation, the current source circuit 10 becomes an on state and fixes the input terminal of the receiving side amplifier (LNA) AMP1 to a constant voltage, which creates a state corresponding to a state in which an input of the receiving side amplifier (LNA) AMP1 is grounded in terms of an AC signal.

Accordingly, a part formed of the inductor L1 and the capacitance C3 connected to the input of the receiving side amplifier (LNA) AMP1 is approximated to the grounded inductor L1 as illustrated in FIG. 3. Therefore, the matching circuit 2 on the transmitting side is approximated to the equivalent circuit formed of the capacitances C1, C2, C4 and the inductors L1, L2 as illustrated in FIG. 3.

As described above, the current source circuit 20 fixes the output terminal of the transmitting side amplifier (PA) AMP2 to a constant voltage at the time of receiving operation, and the current source circuit 10 fixes the input terminal of the receiving side amplifier (LNA) AMP1 to a constant voltage at the time of transmitting operation, so that the receiving side amplifier (LNA) AMP1 and the transmitting side amplifier (PA) AMP2 may be separated in terms of an AC signal, and thus the similar function as that of an antenna switching switch may be realized. Therefore, it becomes possible to easily design the matching circuits on the transmitting side and on the receiving side and to easily optimize the matching circuits while commonly using the antenna ANT without using the antenna switching switch.

Further, since the current source circuit 10 fixes the input terminal of the receiving side amplifier (LNA) AMP1 to a constant voltage at the time of transmitting operation, it is possible to cut off a power supply to the receiving side amplifier (LNA) AMP1 and a circuit connected to a rear stage thereof relating to processing of a reception signal, which enables to reduce the power consumption.

Figure 4:
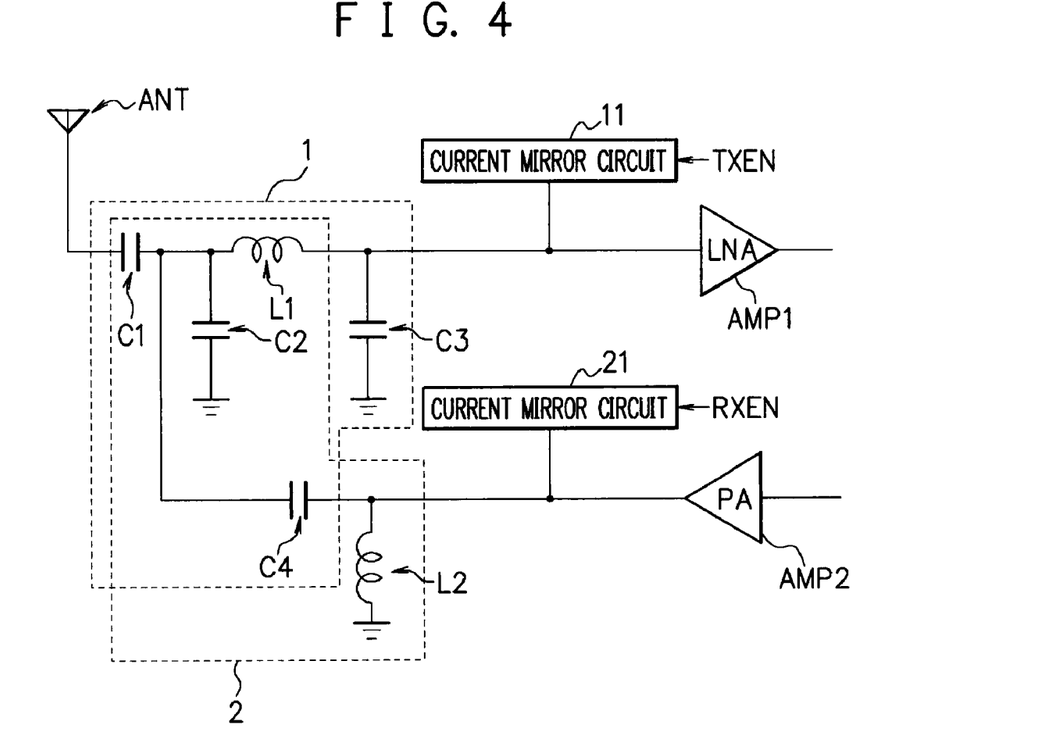
FIG. 4 is a view illustrating a concrete configuration example of the transmitting and receiving circuit according to the present embodiment.

FIG. 4 is a view illustrating a concrete configuration example of the transmitting and receiving circuit according to the present embodiment. In FIG. 4, the similar components as those illustrated in FIG. 1 are denoted by the similar reference numerals, and an overlapped explanation thereof will be omitted.

In the transmitting and receiving circuit illustrated in FIG. 4, a current mirror circuit 11 is applied as the current source circuit 10, and a current mirror circuit 21 is applied as the current source circuit 20. The current mirror circuits 11, 21 are formed of, for instance, CMOS circuits.

Figure 5:
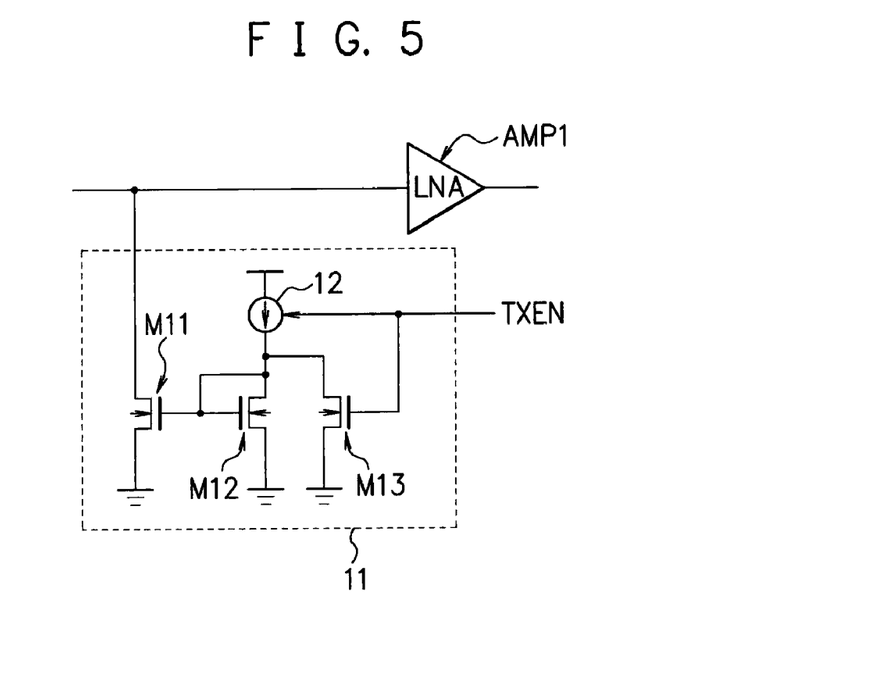
FIG. 5 is a view illustrating a configuration example of a current mirror circuit on a receiving circuit side.

For instance, the current mirror circuit 11 includes three transistors M11, M12, M13, and a current source 12, as illustrated in FIG. 5.

The transistor M11 has a source that is grounded (connected to a reference potential), a drain connected to the input terminal of the receiving side amplifier (LNA) AMP1, and a gate connected to a drain of the transistor M12. The transistor M12 has a source that is grounded, a drain connected to the current source 12 that is on/off-controlled by the control signal TXEN, and a gate connected to the drain. Further, the transistor M13 has a source that is grounded, a drain connected to the drain of the transistor M12, and a gate to which the control signal TXEN is supplied.

In the current mirror circuit 11, a current output end of the current mirror is connected to the input terminal of the receiving side amplifier (LNA) AMP1 as illustrated in FIG. 5. The current mirror circuit 11 fixes the input terminal of the receiving side amplifier (LNA) AMP1 (a connection point between the matching circuit 1 on the receiving side and the input terminal of the receiving side amplifier (LNA) AMP1) to a constant voltage at the time of transmitting operation in accordance with the control signal TXEN.

Figure 6:
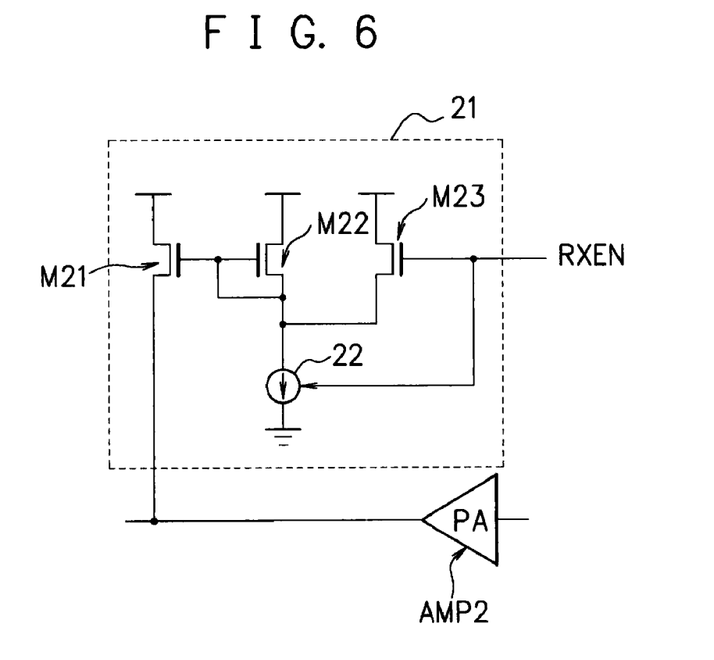
FIG. 6 is a view illustrating a configuration example of a current mirror circuit on a transmitting circuit side.

Further, the current mirror circuit 21 includes, for instance, three transistors M21, M22, M23, and a current source 22, as illustrated in FIG. 6.

The transistor M21 has a source connected to a power supply, a drain connected to the output terminal of the transmitting side amplifier (PA) AMP2, and a gate connected to a drain of the transistor M22. The transistor M22 has a source connected to the power supply, a drain connected to the current source 22 that is on/off-controlled by the control signal RXEN, and a gate connected to the drain. Further, the transistor M23 has a source connected to the power supply, a drain connected to the drain of the transistor M22, and a gate to which the control signal RXEN is supplied.

In the current mirror circuit 21, a current output end of the current mirror is connected to the output terminal of the transmitting side amplifier (PA) AMP2 as illustrated in FIG. 6. The current mirror circuit 21 fixes the output terminal of the transmitting side amplifier (PA) AMP2 (a connection point between the matching circuit 2 on the transmitting side and the output terminal of the transmitting side amplifier (PA) AMP2) to a constant voltage at the time of receiving operation in accordance with the control signal RXEN.

Figure 7:
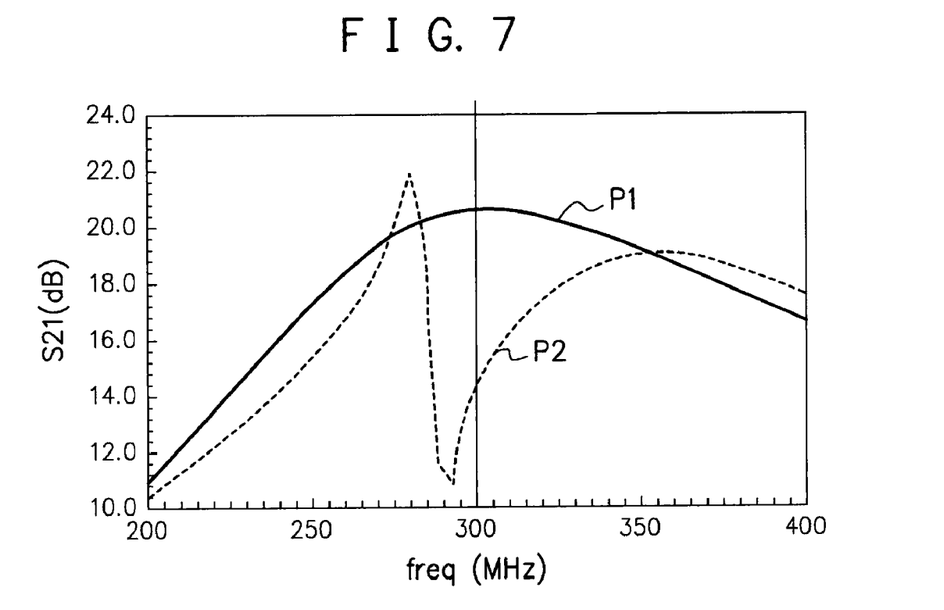
FIG. 7 is a view illustrating a simulation result of characteristics at the time of transmitting operation in the present embodiment.

FIG. 7 illustrates a simulation result of S-parameters (S21) at the time of transmitting operation in the transmitting and receiving circuit according to the present embodiment. In FIG. 7, the S-parameter (S21) in the transmitting and receiving circuit according to the present embodiment is indicated by a solid line P1, and the S-parameter (S21) according to the conventional art is indicated by a dotted line P2, for comparison and reference. As apparent from FIG. 7, it may be confirmed that the matching circuits are optimized in the vicinity of a frequency of 300 MHz in the transmitting and receiving circuit according to the present embodiment.

Note that in the above description, the current supply is designed to be cut off when the current source circuits 10, 20 (current mirror circuits 11, 21) are in an off state, but, it is also possible to configure such that the current supply is not completely cut off but a small amount of current is supplied by controlling an amount of the current supply.

According to the present embodiment, in a transmitting and receiving circuit having electrically connected transmitting side amplifier circuit and receiving side amplifier circuit that commonly use an antenna, by fixing an output terminal of the transmitting side amplifier circuit to a constant voltage at a time of receiving operation and fixing an input terminal of the receiving side amplifier circuit to a constant voltage at a time of transmitting operation, it is possible to separate the transmitting side amplifier circuit and the receiving side amplifier circuit in terms of an AC signal, which enables to easily optimize matching circuits on a transmitting side and on a receiving side.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A transmitting and receiving circuit comprising:
a transmitting side amplifier circuit amplifying a transmission signal transmitted from an antenna;
a receiving side amplifier circuit amplifying a reception signal received by the antenna and being electrically connected to the a transmitting side amplifier circuit;
a first matching circuit matching the antenna and the transmitting side amplifier circuit;
a second matching circuit matching the antenna and the receiving side amplifier circuit;
a first current source circuit capable of controlling an operating state and setting a first connection point between the first matching circuit and an output terminal of the transmitting side amplifier circuit to a given voltage; and
a second current source circuit capable of controlling an operating state and setting a second connection point between the second matching circuit and an input terminal of the receiving side amplifier circuit to a given voltage.
2. The transmitting and receiving circuit according to claim 1, wherein
the first current source circuit sets the first connection point to a given voltage in case of receiving operation, and becomes an off state in case of transmitting operation.

3. The transmitting and receiving circuit according to claim 1, wherein
the second current source circuit sets the second connection point to a given voltage in case of transmitting operation, and becomes an off state in case of receiving operation.

4. The transmitting and receiving circuit according to claim 1, wherein
the first current source circuit is a first current mirror circuit, and the second current source circuit is a second current mirror circuit.

5. The transmitting and receiving circuit according to claim 4, wherein
the first and second current mirror circuits are formed of CMOS circuits.

6. The transmitting and receiving circuit according to claim 4, wherein
the first current mirror circuit comprises:
a first internal current source;
a first transistor having a source connected to a power supply, a drain connected to the first internal current source, and a gate connected to the drain; and
a second transistor having a source connected to the power supply, a drain connected to the output terminal of the transmitting side amplifier circuit, and a gate connected to the drain of the first transistor.

7. The transmitting and receiving circuit according to claim 4, wherein
the second current mirror circuit comprises:
a second internal current source;
a third transistor having a source that is grounded, a drain connected to the second internal current source, and a gate connected to the drain; and
a fourth transistor having a source that is grounded, a drain connected to the input terminal of the receiving side amplifier circuit, and a gate connected to the drain of the third transistor.

8. The transmitting and receiving circuit according to claim 1, wherein
at least either of the first current source circuit and the second current source circuit controls an amount of current supply in accordance with the operating state.

9. The transmitting and receiving circuit according to claim 1, wherein
the first matching circuit and the second matching circuit are formed by sharing circuit elements.

10. The transmitting and receiving circuit according to claim 2, wherein
the second current source circuit sets the second connection point to a given voltage in case of transmitting operation, and becomes an off state in case of receiving operation.

* * * * *